(12) United States Patent
Hettich et al.

(10) Patent No.: US 8,449,235 B2
(45) Date of Patent: May 28, 2013

(54) METHOD FOR PRODUCING A THREADED INSERT WITH AN INTERNAL AND EXTERNAL THREAD, AND THREADED INSERT

(75) Inventors: Ulrich Hettich, Schramberg (DE); Stefan Hettich, Schramberg (DE)

(73) Assignee: Ludwig Hettich & Co., Schramberg-Sulgen (DE)

( * ) Notice: Subject to any disclaimer, the term of this patent is extended or adjusted under 35 U.S.C. 154(b) by 416 days.

(21) Appl. No.: 12/743,104

(22) PCT Filed: Sep. 18, 2008

(86) PCT No.: PCT/EP2008/007829
§ 371 (c)(1),
(2), (4) Date: Jul. 27, 2010

(87) PCT Pub. No.: WO2009/062566
PCT Pub. Date: May 22, 2009

(65) Prior Publication Data
US 2010/0316466 A1  Dec. 16, 2010

(30) Foreign Application Priority Data
Nov. 16, 2007 (DE) .......................... 10 2007 054 798

(51) Int. Cl.
*F16B 37/12* (2006.01)
(52) U.S. Cl.
USPC .......................... 411/178; 411/387.8; 411/395
(58) Field of Classification Search
USPC ................... 411/178, 387.1, 387.3, 395, 411, 411/413, 415, 436
See application file for complete search history.

(56) References Cited

U.S. PATENT DOCUMENTS

| 126,366 A * | 4/1872 | Wills ......................... 411/387.4 |
| 1,227,627 A * | 5/1917 | Kennedy ....................... 411/178 |
| 1,396,611 A * | 11/1921 | White ........................... 411/178 |
| 2,444,145 A * | 6/1948 | Rosan ........................... 411/178 |
| 3,081,808 A * | 3/1963 | Rosan et al. .................. 411/178 |
| 3,179,144 A * | 4/1965 | Brown .......................... 411/178 |
| 3,319,690 A * | 5/1967 | Rosan et al. .................. 411/178 |
| 3,405,591 A * | 10/1968 | Neuschotz .................... 411/416 |
| 3,497,890 A * | 3/1970 | Coyle ............................. 470/25 |

(Continued)

FOREIGN PATENT DOCUMENTS

| AT | 225507 | 1/1963 |
| DE | 732020 | 2/1943 |
| DE | 90 17 935.8 | 9/1991 |
| WO | WO 82/00505 | 2/1982 |

OTHER PUBLICATIONS

International Searching Authority, International Preliminary Report on Patentability (Written Opinion) in corresponding International Patent Application No. PCT/EP2008/007829, Sep. 18, 2008, p. 1-7.

*Primary Examiner* — Roberta Delisle
(74) *Attorney, Agent, or Firm* — Duane Morris LLP

(57) ABSTRACT

The invention relates to a method for producing a threaded insert having an internal and external thread which have different thread pitches or the same thread pitch, wherein the threaded insert is wound from a profile strip which, on the one side thereof, is pre-shaped with the profile of the external thread, and on the other side thereof, is pre-shaped with the profile of the internal thread, and to a threaded insert which is generated by means of said method.

10 Claims, 4 Drawing Sheets

U.S. PATENT DOCUMENTS

| | | | |
|---|---|---|---|
| 3,687,181 A | 8/1972 | Coyle | |
| 4,097,061 A * | 6/1978 | Dietlein | 280/607 |
| 4,486,484 A | 12/1984 | Schafer | |
| 4,822,223 A * | 4/1989 | Williams | 411/82 |
| 5,536,121 A * | 7/1996 | McSherry | 411/31 |
| 5,833,415 A * | 11/1998 | McSherry | 411/31 |
| 6,290,443 B1 * | 9/2001 | Uno | 411/178 |
| 6,672,811 B2 * | 1/2004 | Schultz | 411/110 |
| 7,819,613 B2 * | 10/2010 | Strom | 411/178 |
| 2004/0136807 A1 * | 7/2004 | Foerster, Jr. | 411/178 |
| 2005/0141982 A1 * | 6/2005 | Schultz | 411/178 |
| 2007/0009341 A1 | 1/2007 | Nagayama | |

* cited by examiner

METHOD FOR PRODUCING A THREADED INSERT WITH AN INTERNAL AND EXTERNAL THREAD, AND THREADED INSERT

The invention relates to method for producing a threaded insert having an internal and external thread which each have a freely selectable thread pitch and a freely selectable number of threads (thread starts), and to a threaded insert. Known threaded inserts of this type (U.S. Pat. No. 3,687,181A, US 2007/009341A1) are generated by rolling a flat material pre-shaped on both sides with the corresponding thread profiles about an axis which extends in longitudinal direction of the threaded insert, thereby leaving a longitudinal groove.

Such threaded insert are used as connecting elements for generating connections of components made of different materials such as connections between steel and plastic, steel and aluminum, or steel and wood. The threaded inserts can be build-in or embedded during the production of the components or can be integrated later for repair purposes.

Known and in use are solid threaded sleeves having internal and external threads with freely selectable thread pitches in a one thread (single-start) or a multiple thread (multi-start) design. Such threaded sleeves can be adapted in an ideal manner to the requirements for different material combinations. However, the production by means of machining is extremely complicated and wasteful due to the high volume of removed metal.

Further, also known are threaded inserts made of wound profiled wire, for example under the trade name HELICOIL. For such threaded inserts, the pitch of the external thread is necessarily the same as the pitch of the internal thread. The production of such threaded inserts is considerably more cost effective. However, their use is limited due to the same thread pitches of internal and external threads because a connection generated therewith has only a limited strength.

The object of the invention is to provide a method for producing a threaded insert of the above described type, as well as a threaded insert which, on the one hand, can be produced in a cost-effective manner and, on the other hand, can be used without limitation for all conceivable connection tasks.

For solving this object serve a method according to patent claim 1 and a threaded insert according to patent claim 7.

Advantageous embodiments of the invention are described in the sub-claims.

Essential for the invention is the knowledge that a wound threaded insert made from a profile strip profiled on both sides having the desired external tread profile on the outside and the desired internal thread profile on the inside can completely satisfy the needs of all variants of applications with respect to production, strength and durability of the connection.

It is also conceivable that the external thread and the internal thread have opposite thread directions, thus, that one of them is formed left-handed and the other one is formed right-handed.

In case of different pitches of internal thread and external thread it has to be provided that a single wound winding of the profile strip corresponds to the integral multiples of the thread windings.

In a coordinate system X', Y' relating to the profile strip, pitch angles for the external thread and for the internal thread are to be selected for the respective thread profile in the profile strip can be defined in a generalized form. Apart from well-known metals, the threaded insert can also be made at least in part from plastic.

To allow an unproblematic non-cutting thread forming with the screw-in part of the finished wound threaded insert, it is of advantage when in the region of the screw-in tip including one to two windings of the external thread, the profile strip's adjacent shaft region is made from a material which is particularly suitable for form tapping, such as a hardenable steel, and the load transmitting region of the adjacent shaft is made from a stainless steel.

Based on a profile strip according to the invention, by winding and subsequent repeated cutting perpendicular to the winding axis, threaded inserts of any length can be produced in a fast and economical manner, preferably from metallic materials of all kinds.

With the method according to the invention, the winding pitch angle can be varied during winding of the profile strip in a manner as proposed by the applicant in the German patent application 10 2007 035 183.8.

The method according to the present invention results in that the production at least of rather long threaded rods is more economical than the production by machining solid material. For this, the width of the profile strip is to be adjusted for the smallest pitch of the external thread.

With the method according to the invention, there is virtually no waste because all essential work steps are carried out by non-cutting forming and not by machining.

The invention is illustrated hereinafter in more detail by means of drawings of exemplary embodiments with further details. In the figures:

FIG. 1 shows a side view, FIG. 2 shows a front end view viewed from the head side of the threaded insert, FIG. 3 shows a part of an extended threaded insert according to the first embodiment, FIG. 4 shows a section along the line IV-IV in FIG. 3;

FIG. 5 shows a side view of a threaded insert according to the second embodiment, FIG. 6 shows a side view of the part of an extended threaded insert according to the second embodiment, FIG. 7 shows a section along the line VII-VII in FIG. 6;

FIG. 8 shows a side view of a part of the threaded insert according to the third embodiment, and FIG. 9 shows a section similar to FIG. 7 of the threaded insert according to FIG. 8;

FIG. 10 shows a threaded insert according to FIG. 1, FIG. 11 shows a threaded insert according to FIG. 5, and FIG. 12 shows a threaded insert according to FIG. 8

Figure 1:
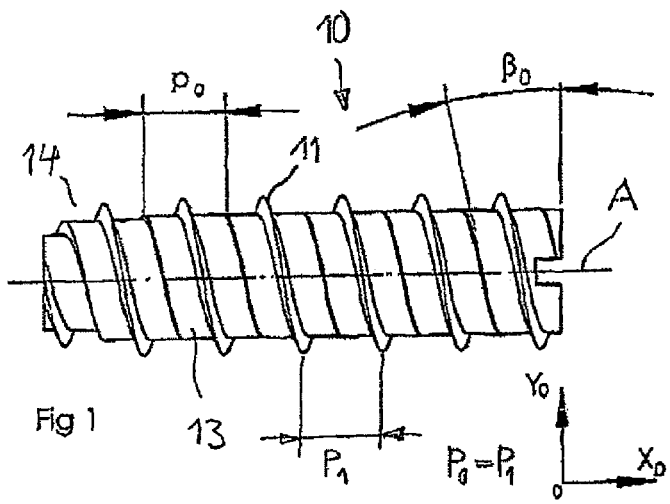
FIGS. 1 to 4 show a first embodiment of a threaded insert according to the invention, namely

The following stands for:

Index 0—profile strip,

Index 1—external thread,

Index 2—internal thread,

R—radius of the neutral axis of the cross-section of the threaded insert in which the bending load becomes zero, $g_1$, $g_2$—number of threads of the external or internal threads, $p_0$—winding pitch of the profile strip, $p_1$, $p_2$—thread pitch of the external or internal threads, $n_1$, $n_2$—number of windings of the external or internal thread over the length of the winding pitch $p_0$, $\beta_0$—winding pitch angle of the profile strip in a coordinate system $X_0$, $Y_0$ relating to the axis A of the threaded insert, $\beta_1'$, $\beta_2'$—thread pitch angle of internal/external thread in coordinate systems $X_1'$, $Y_1'$ and $X_2'$, $Y_2'$ relating to the profile strip in which each of the $Y'_{1,2}$-axes extend parallel to the longitudinal direction of the strip and each of the $X'_{1,2}$-axes extend in width direction of the strip.

Below, three embodiments of a threaded insert according to the invention are described. The following considerations and formulas apply to all three embodiments.

With specified values for the winding pitch $p_0$ and the radius R of the neutral axis, the pitch angle $\beta_0$ of the winding pitch is calculated to be $$\beta_0 = \arctan\left(\frac{p_0}{2 \cdot \pi \cdot R}\right)$$

Thus, the width b of the profile strip is $b = p_0 \cdot \cos \beta_0.$

The winding pitch $p_0$ can be represented as a multiple of the thread pitches $p_1$ of the external thread and $p_2$ of the internal thread:

$n_1 \cdot p_1 = p_0$ $n_2 \cdot p_2 = p_0$

A profile strip with grooves provided therein for an external and an internal thread can be configured with the following angle specification for the pitch angles $\beta_1'$ (external thread) and $\beta_2'$ (internal thread):

External Thread:

In a $X_1'/Y_1'$-coordinate system, the pitch angle $\beta_1$ of the external thread with respect to the longitudinal direction of the profile strip is determined by $$\beta_1' = \beta_0 - \arctan\left(\frac{p_0}{n_1 \cdot 2 \cdot \pi \cdot R}\right)$$

Internal Thread:

In a $X_2'/Y_2'$-coordinate system of the profile strip, the pitch angle of the internal thread with respect to the longitudinal direction of the profile strip is determined by:

$$\beta_2' = \beta_0 - \arctan\left(\frac{p_0}{n_2 \cdot 2 \cdot \pi \cdot R}\right)$$

Subsequent to these general considerations, the thread inserts shown in the drawings will now be described in detail. As first embodiment, a threaded insert according to the FIGS. 1 to 4 which is made from a profile strip 13 with a width b and a winding pitch $p_0$ wound at a winding pitch angle $\beta_0$ is illustrated in a coordinate system $X_0$, $Y_0$ in which the axis A of the threaded insert is parallel to the $X_0$-axis.

The threaded insert 10 has a single-start external thread 11 with the same pitch $p_1$ as the winding pitch $p_0$ of the profile strip 13. Thus, it holds $n_1=1$ and $p_0=p_1$. The internal thread 12 has a smaller pitch $p_2$. For the number of windings holds $n_2=5$, thus, for the thread pitches thus holds $5 \cdot p_2 = p_0 = p_1$, and for the pitch angles of external and internal thread holds $\beta_1'=0$, $\beta_2' \neq 0$.

Figure 3:
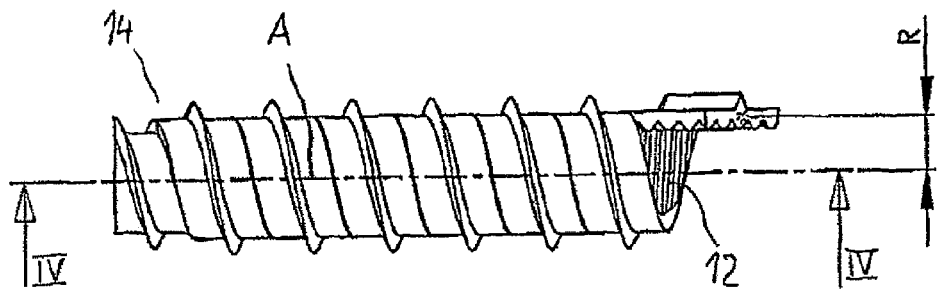
Figure 4:
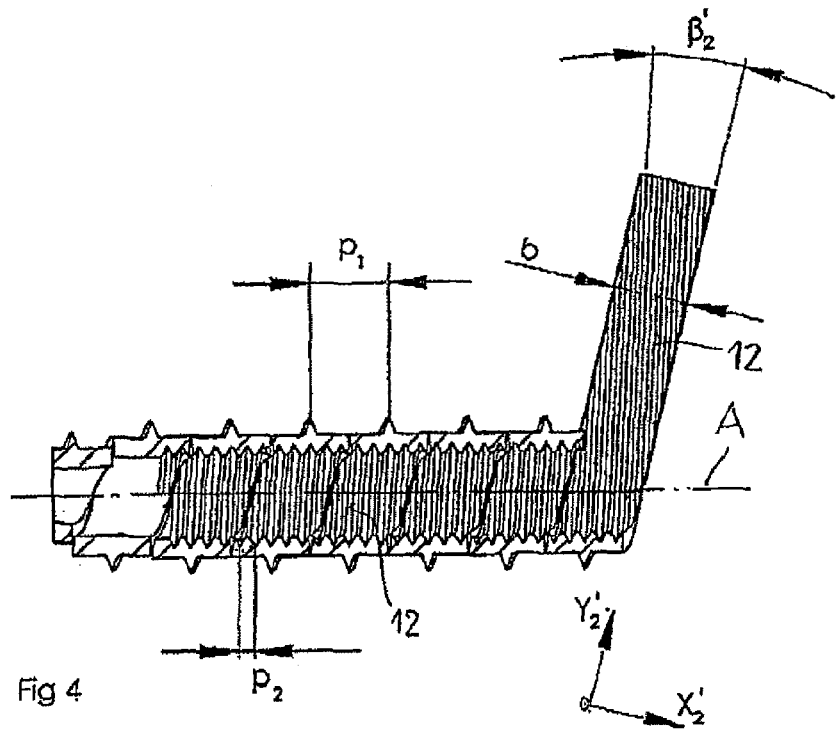

The thread grooves of the external thread thus run parallel to the outer edges of the profile strip, as shown in the FIGS. 1 and 3.

Such a profile can be manufactured in a simple manner by pultrusion or profile rolling.

It is apparent from FIGS. 1 to 4 that in the region of the thread tip, the profile strip is wound to form a conical taper 14 to allow an easier screwing-in into a pre-drilled opening.

In the head region of the threaded insert 10, a recess 15 for insertion of a screwing tool (not shown) is provided.

Figure 5:
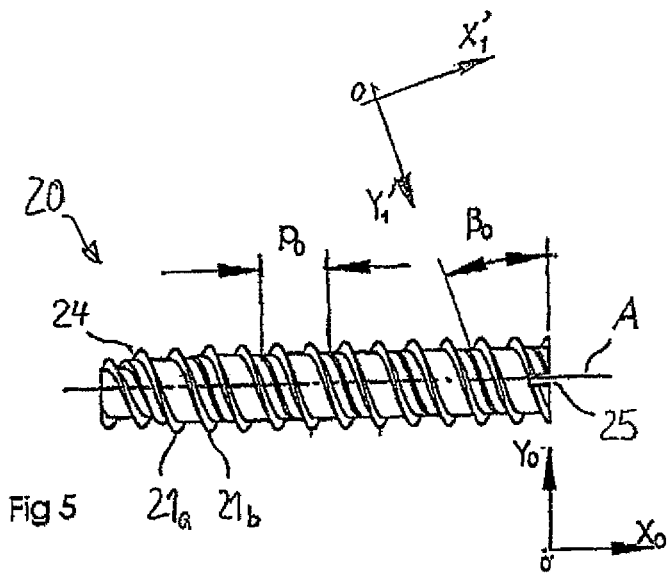
FIGS. 5 to 7 show a second embodiment according to the invention, namely
Figure 6:
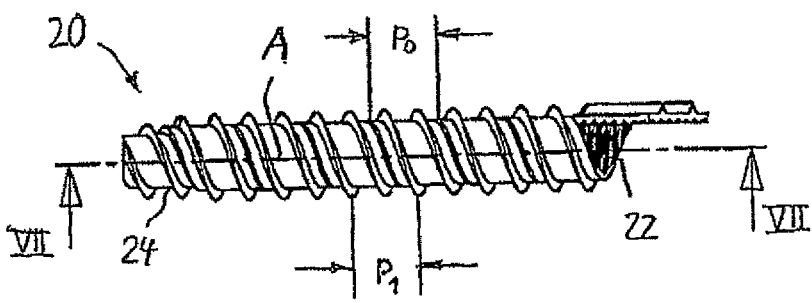
Figure 7:
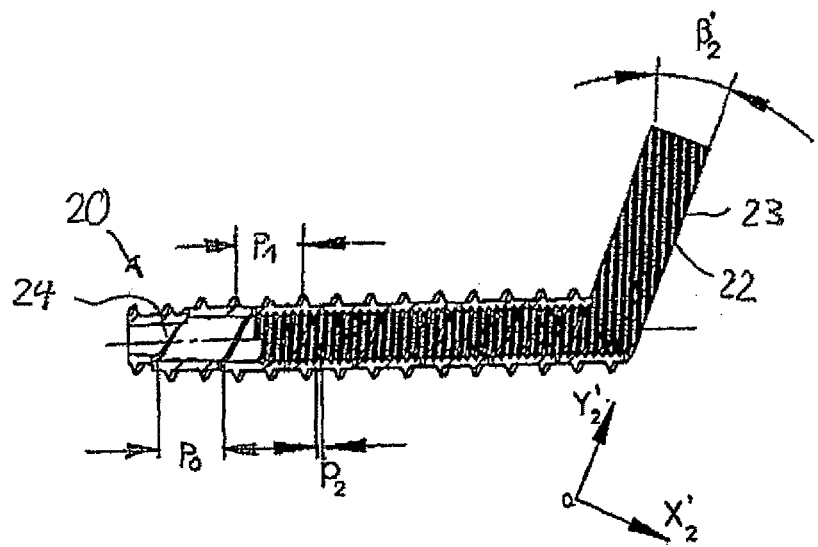

In the FIGS. 5 to 7, all reference numerals are increased by 10 with respect to the reference numerals used in FIG. 1. In the FIGS. 5 to 7, a threaded insert 20 having a double-start external thread 21 with the two thread turns 21a and 21b is illustrated, wherein again thread pitch $p_1$ is equal to winding pitch $p_0$. The internal thread is designed as a single-start thread with $n_2=10$ and accordingly with a thread pitch of $10 \cdot p_2 = p0$. Here too, the pitch angle is $\beta_1'=0$ (FIG. 5), while $\beta_2' \neq 0$ (FIG. 7).

Figure 2:
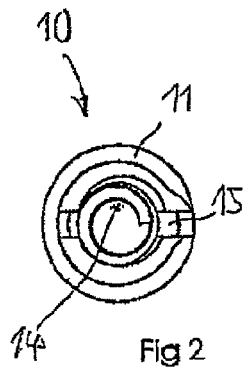
Figure 8:
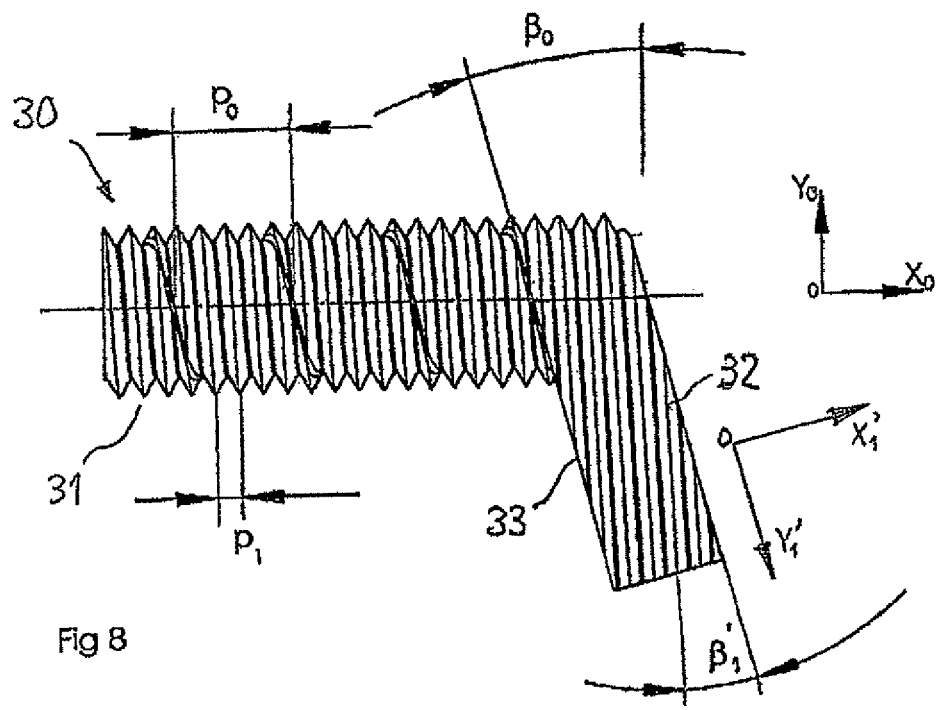
FIGS. 8 and 9 show a third embodiment of a threaded insert according to the invention, namely
Figure 9:
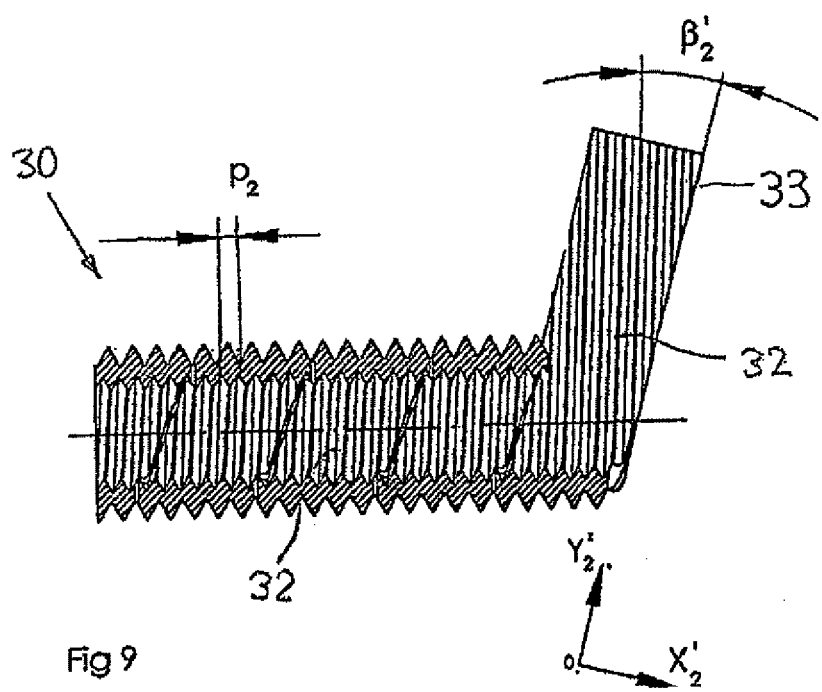
Figure 10:
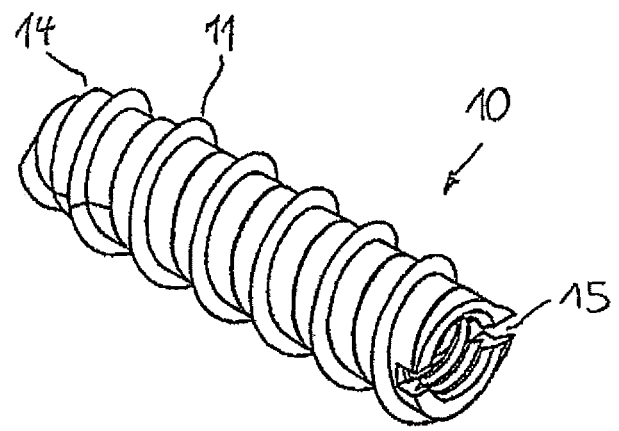
FIGS. 10 to 12 show perspective views of three different threaded inserts according to the invention, namely
Figure 11:
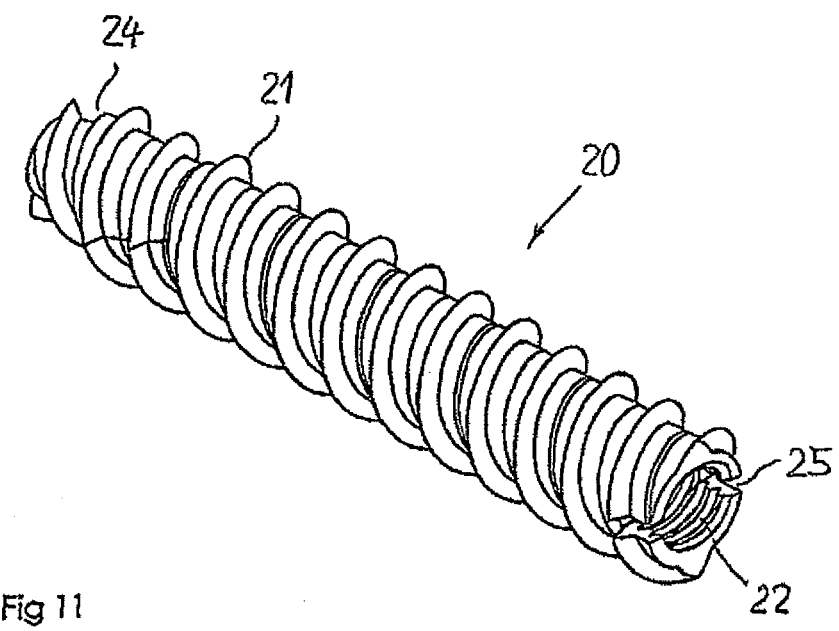
Figure 12:
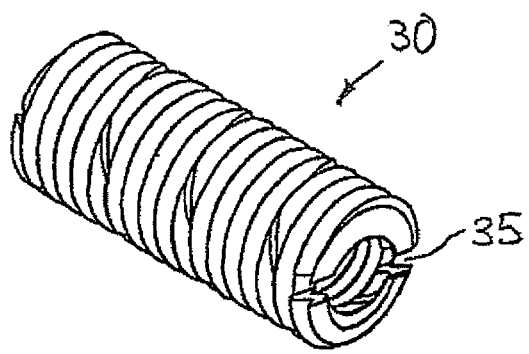

In the FIGS. 8 and 9, all reference numerals are increased again by 10 with respect to the reference numerals of FIG. 2. As a third embodiment, a threaded insert 30 is illustrated with a single-start external thread 31, the thread pitch of which is $p_1 < p_0$. With $n_1=5$ holds $5 \cdot p_1 = p_0$. The internal thread 32 is also a single-start thread and $p_2$ is smaller than $p_0$. Therefore, with $n_2=7$ holds $7 \cdot p_2 = p_0$. The pitch angles $\beta_1'$ and $\beta_2'$ differ from one another and from zero: $\beta_1' \neq 0$, $\beta_2' \neq 0$ and $\beta_1' \neq \beta_2'$.

Also conceivable are embodiments in which internal threads and external threads are reversed, thus, e.g., the internal thread is a left-hand thread and the external thread is a right-hand thread.

The features disclosed in the above description, the claims and the drawings, individually as well as in any combination, can be of importance for the implementation of the invention in its different embodiments.

The invention claimed is:

1. A method for producing a threaded insert having an internal and external thread which have different or the same thread pitches, wherein the threaded insert is pre-shaped on the one side thereof with the profile of the external thread and on the other side thereof with the profile of the internal thread, characterized in that the threaded insert is wound from a profile strip which is pre-shaped with the corresponding thread profiles, wherein the profile strip is pre-shaped from two metal sheets which consist of a hardenable steel in the region of the screw-in tip of the threaded insert, and a stainless steel in the load transmitting region of the threaded insert, wherein prior to the winding, the two steel sheets are connected to one another by joining, in particular welding.

2. The method according to claim 1, characterized in that the winding pitch ($p_0$) of the profile strip is equal to the thread pitch ($p_1$) of the external thread or the thread pitch ($p_2$) of the internal thread.

3. The method according to claim 1, characterized in that the winding pitch of the profile strip and the thread pitch of the external thread and/or the thread pitch of the internal thread are different.

4. A method for producing a threaded insert having an internal and external thread which have different or the same thread pitches, wherein the threaded insert is pre-shaped on the one side thereof with the profile of the external thread and on the other side thereof with the profile of the internal thread, characterized in that the threaded insert is wound from a profile strip which is pre-shaped with the corresponding thread profiles; wherein the thread pitches ($p_1$, $p_2$) of the external thread and internal thread have the following relation to the angle pitch ($p_0$):

$n_1 \cdot p_1 = n_2 \cdot p_2 = p_0,$ wherein $n_1$=number of windings of the external thread over the length of the winding pitch $p_0$, $n_2$=number of windings of the internal thread over the length of the winding pitch $p_0$, and $n_1$, $n_2$ are integral.

5. The method according to claim 4, characterized in that the profile strip is pre-shaped from at least one metal sheet.

6. The method according to claim 4, characterized in that the profile strip is wound in the screw-in region of the threaded insert to form a conical taper.

7. The method according to claim 4, characterized in that the pitch angle $\beta_1'$ for the external thread and the pitch angle $\beta_2'$ for the internal thread, each of them in profile strip-related coordinate systems $X'_{1,2}$, $Y'_{1,2}$, result from the relations $$\beta_1' = \beta_0 - \arctan\left(\frac{p_0}{n_1 \cdot 2 \cdot \pi \cdot R}\right)$$

$$\beta_2' = \beta_0 - \arctan\left(\frac{p_0}{n_2 \cdot 2 \cdot \pi \cdot R}\right)$$

wherein
R=radius of the neutral axis of the threaded insert
$\beta_1'$=pitch angle of the external thread
$\beta_2'$=pitch angle of the internal thread.

8. A threaded insert having an internal and external thread which have different or the same thread pitches, wherein the threaded insert is pre-shaped on the one side thereof with the profile of the external thread and on the other side thereof with the profile of the internal thread, characterized in that the threaded insert represents a winding from a profile strip having the corresponding pre-shaped thread profiles; wherein the thread pitches ($p_1$, $p_2$) of the external thread and the internal thread are related to the winding pitch ($p_0$) as follows:

$$n_1 \cdot p_1 = n_2 \cdot p_2 = p_0,$$

wherein
$n_1$=number of windings of the external thread over the length of the winding pitch $p_0$,
$n_2$=number of windings of the internal thread over the length of the winding pitch $p_0$ and $n_1$, $n_2$ are integral.

9. The threaded insert according to claim 8, characterized in that the width (b) of the profile strip, with a winding pitch angle of $$\beta_0 = \arctan\left(\frac{p_0}{2\pi R}\right)$$

results to $b = p_0 \cdot \cos(\beta_0)$ with $p_0$=winding pitch, $\beta_0$=winding pitch angle in a coordinate system $X_0$, $Y_0$ relating to the axis A of the threaded insert, and with R=radius of the neutral axis.

10. The threaded insert according to claim 8, characterized in that the pitch angle $\beta_1'$ for the external thread and the pitch angle $\beta_2'$ for the internal thread, each of them in profile strip-related coordinate systems $X'_{1,2}$, $Y'_{1,2}$, result from the relations $$\beta_1' = \beta_0 - \arctan\left(\frac{p_0}{n_1 \cdot 2 \cdot \pi \cdot R}\right)$$

$$\beta_2' = \beta_0 - \arctan\left(\frac{p_0}{n_2 \cdot 2 \cdot \pi \cdot R}\right)$$

wherein
R=radius of the neutral axis of the threaded insert
$\beta_1'$=pitch angle of the external thread
$\beta_2'$=pitch angle of the internal thread.

* * * * *